(12) United States Patent
Detroja et al.

(10) Patent No.: US 11,663,477 B2
(45) Date of Patent: May 30, 2023

(54) SYSTEMS AND METHODS FOR GENERATING MUSIC RECOMMENDATIONS

(71) Applicant: Meta Platforms, Inc., Menlo Park, CA (US)

(72) Inventors: Parth Popatlal Detroja, Seattle, WA (US); Bokai Cao, Newark, CA (US); Amit Kumar Singh, San Jose, CA (US)

(73) Assignee: Meta Platforms, Inc., Menlo Park, CA (US)

(*) Notice: Subject to any disclaimer, the term of this patent is extended or adjusted under 35 U.S.C. 154(b) by 6 days.

(21) Appl. No.: 17/531,630

(22) Filed: Nov. 19, 2021

(65) Prior Publication Data
US 2022/0180900 A1 Jun. 9, 2022

Related U.S. Application Data

(63) Continuation of application No. 16/573,802, filed on Sep. 17, 2019, now abandoned.

(51) Int. Cl.
| | |
|---|---|
| *G11B 27/36* | (2006.01) |
| *G11B 27/036* | (2006.01) |
| *G06K 9/62* | (2022.01) |
| *G06N 20/00* | (2019.01) |
| *G06V 20/40* | (2022.01) |

(52) U.S. Cl.
CPC .......... *G11B 27/036* (2013.01); *G06K 9/6215* (2013.01); *G06N 20/00* (2019.01); *G06V 20/46* (2022.01)

(58) Field of Classification Search
CPC .................................................... G11B 27/036
See application file for complete search history.

(56) References Cited

U.S. PATENT DOCUMENTS

| | | | |
|---|---|---|---|
| 9,129,227 B1* | 9/2015 | Yee ...................... | G06N 3/0472 |
| 10,140,515 B1* | 11/2018 | Waldo ................. | G06V 10/761 |
| 2016/0104154 A1 | 4/2016 | Milov et al. | |
| 2016/0149956 A1* | 5/2016 | Birnbaum .............. | H04L 63/20 726/1 |
| 2019/0028766 A1* | 1/2019 | Wold ................... | G06Q 50/184 |
| 2019/0385243 A1* | 12/2019 | Childers ............. | G06F 16/9535 |

\* cited by examiner

*Primary Examiner* — Daniel T Tekle
(74) *Attorney, Agent, or Firm* — Sheppard Mullin Richter & Hampton LLP

(57) ABSTRACT

Systems, methods, and non-transitory computer-readable media can be configured to determine a video embedding for a video content item based at least in part on a first machine learning model. A set of music embeddings can be determined for a set of music content items based at least in part on a second machine learning model. The set of music content items can be ranked based at least in part on the video embedding and the set of music embeddings.

20 Claims, 8 Drawing Sheets

SYSTEMS AND METHODS FOR GENERATING MUSIC RECOMMENDATIONS

CROSS-REFERENCE TO RELATED APPLICATIONS

This application is a continuation of U.S. patent application Ser. No. 16/573,802, filed on Sep. 17, 2019 and entitled "SYSTEMS AND METHODS FOR GENERATING MUSIC RECOMMENDATIONS", which is incorporated in its entirety herein by reference.

FIELD OF THE INVENTION

The present technology relates to the field of machine learning. More particularly, the present technology relates to generating music recommendations based on machine learning methodologies.

BACKGROUND

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Other users may access the social networking system and interact with the shared content item.

SUMMARY

Various embodiments of the present technology can include systems, methods, and non-transitory computer readable media configured to determine a video embedding for a video content item based at least in part on a first machine learning model. A set of music embeddings can be determined for a set of music content items based at least in part on a second machine learning model. The set of music content items can be ranked based at least in part on the video embedding and the set of music embeddings.

In an embodiment, one or more video feature embeddings can be generated based at least in part on one or more video features associated with the video content item. The video embedding can be generated based at least in part on the one or more video feature embeddings.

In an embodiment, the one or more video features associated with the video content item includes at least one of: a concept, an object, or a visual characteristic identified in the video content item.

In an embodiment, a set of music feature embeddings can be generated based at least in part on one or more music features associated with the set of music content items. The set of music embeddings can be generated based at least in part on the set of music feature embeddings.

In an embodiment, the one or more music features associated with the set of music content items includes at least one of: a title, a lyric, a genre, or a spectrogram associated with the set of music content items.

In an embodiment, the ranking the set of music content items can include generating a subset of music embeddings based at least in part on a proximity between the video embedding and the set of music embeddings.

In an embodiment, the ranking the set of music content items can include ranking a subset of the set of music content items associated with the subset of music embeddings based at least in part on a measure of similarity between the video embedding and the subset of music embeddings.

In an embodiment, the video embeddings and the set of music embeddings are mapped in a vector space.

In an embodiment, the first machine learning model and the second machine learning model are trained based at least in part on training sets of data that include training video content items and training music content items included in the training video content items.

In an embodiment, one or more music recommendations can be provided based on the ranking.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
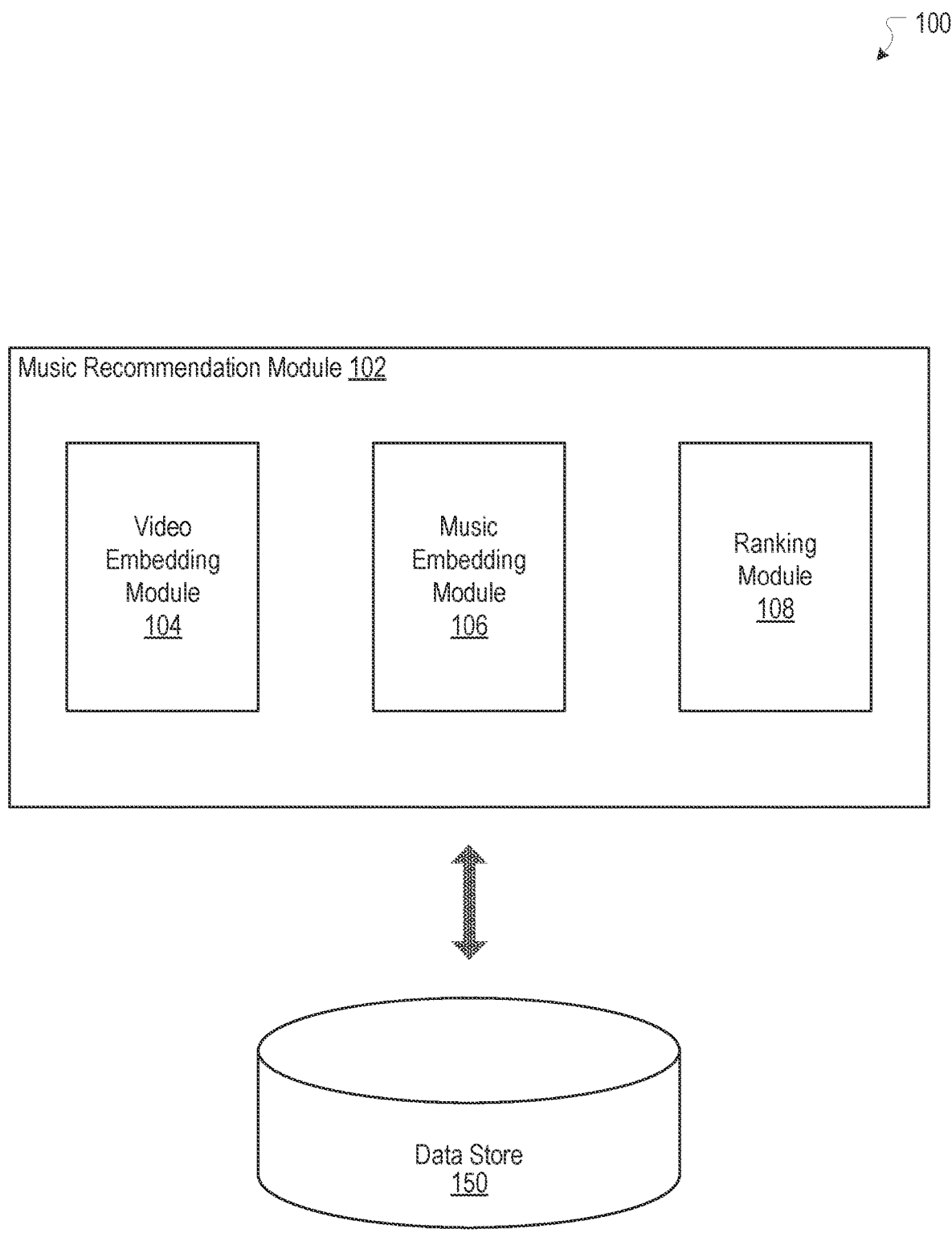
FIG. 1 illustrates an example system including a music recommendation module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Generating Music Recommendations

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system.

Another user may access the social networking system and interact with the shared content item.

Under conventional approaches, a user can access a variety of content items, such as images, videos, articles, and links, provided by a social networking system (or service). Some of these content items are shared content items that are shared by users of the social networking system. For example, a user may access a social networking system and interact with various content items via the social networking system. Many of these content items may be shared by other users of the social networking system. The user can also share a content item via the social networking system, and the other users can interact with the content items shared by the user. In some cases, a user may wish to share a video content item and enhance the video content item by including music in the video content item. However, conventional approaches fail to provide complementary music based on a video content item. Accordingly, conventional approaches are ineffective in addressing these and other problems arising in computer technology.

An improved approach rooted in computer technology overcomes the foregoing and other disadvantages associated with conventional approaches specifically arising in the realm of computer technology. In various embodiments, the present technology provides for generating a recommendation for music content items based on a video content item and providing the recommendation to a user. The user can provide the video content item, for example, by sharing the video content item via a social networking system. Video feature embeddings can be generated using machine learning methodologies based on various features associated with the video content item. In general, an embedding can be a numerical representation (e.g., vector) of a feature or a set of features. One video feature embedding can be generated, for example, based on concepts identified in the video content item, and another video feature embedding can be generated, for example, based on visual characteristics identified in the video content item. Such video feature embeddings can, using machine learning methodologies, be combined (e.g., concatenated) and transformed (e.g., weighted, normalized), to generate a video embedding associated with the video content item. The video embedding can be evaluated with music embeddings associated with music content items. The music embeddings can be generated using machine learning methodologies to combine and transform music feature embeddings associated with the music content items. The music feature embeddings can be generated using machine learning methodologies based on various features associated with the music content items. The music feature embeddings can be generated, for example, based on genres, titles, artists, lyrics, and spectrograms associated with the music content items. The music content items can be ranked based on the evaluation of the music embeddings and the video embeddings. Higher ranked music content items can be provided to the user as a recommendation for the music content items. The user can choose to enhance the video content item by including one of the music content items. More details relating to the disclosed technology are provided below.

FIG. 1 illustrates an example system 100 including a music recommendation module 102, according to an embodiment of the present technology. As shown in the example of FIG. 1, the music recommendation module 102 can include a video embedding module 104, a music embedding module 106, and a ranking module 108. In some instances, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the music recommendation module 102 can be implemented in any suitable combinations.

In some embodiments, the music recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the music recommendation module 102 can be, in part or in whole, implemented as software running on one or more computing devices or systems, such as on a server system or a client computing device. In some instances, the music recommendation module 102 can be, in part or in whole, implemented within or configured to operate in conjunction with or be integrated with a social networking system (or service), such as a social networking system 630 of FIG. 6. Likewise, in some instances, the music recommendation module 102 can be, in part or in whole, implemented within or configured to operate in conjunction with or be integrated with a client computing device, such as the user device 610 of FIG. 6. For example, the music recommendation module 102 can be implemented as or within a dedicated application (e.g., app), a program, or an applet running on a user computing device or client computing system. The application incorporating or implementing instructions for performing functionality of the music recommendation module 102 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The music recommendation module 102 can be configured to communicate and/or operate with the at least one data store 150, as shown in the example system 100. The at least one data store 150 can be configured to store and maintain various types of data. In some implementations, the at least one data store 150 can store information associated with the social networking system (e.g., the social networking system 630 of FIG. 6). The information associated with the social networking system can include data about users, user identifiers, social connections, social interactions, profile information, demographic information, locations, geofenced areas, maps, places, events, pages, groups, posts, communications, content, feeds, account settings, privacy settings, a social graph, and various other types of data. In some embodiments, the at least one data store 150 can store information that is utilized by the music recommendation module 102. For example, the at least one data store 150 can store information associated with video embeddings and music embeddings. It is contemplated that there can be many variations or other possibilities.

In various embodiments, the video embedding module 104 can generate a video embedding based on one or more video feature embeddings associated with various features of a video content item. The video feature embeddings can be generated based on the various features of the video content item using machine learning methodologies (e.g., image recognition). The various features can include, for example, concepts, objects, and visual characteristics associated with the video content item. The video embedding can be generated based on the video feature embeddings using machine learning methodologies. A machine learning model (e.g., multilayer perceptron) can be trained to combine and transform the video feature embeddings to generate the video embedding. In some cases, a video embedding can be evaluated with music embeddings associated with music content items, and the music content items can be ranked based on the evaluation. A recommendation for a music content item to be included in a video content item associated with the video embedding can be generated based on the ranking. More details regarding the video embedding module 104 will be provided with reference to FIG. 2A.

In various embodiments, the music embedding module 106 can generate a music embedding based on one or more music feature embeddings associated with various features of a music content item. The music feature embeddings can be generated based on the various features of the music content item using machine learning methodologies (e.g., text recognition, sound recognition). The various features can include, for example, genres, titles, artists, lyrics, and spectrograms associated with the music content item. The music embedding can be generated based on the music feature embeddings using machine learning methodologies. A machine learning model (e.g., multilayer perceptron) can be trained to combine and transform the music embeddings to generate the music embedding. In some cases, a set of music embeddings associated with a set of music content items can be evaluated with a video embedding, and the set of music content items can be ranked based on the evaluation. A recommendation for a music content item to be included in a video content item associated with the video embedding can be generated based on the ranking. More details regarding the music embedding module 106 will be provided with reference to FIG. 2B.

In various embodiments, the ranking module 108 can rank a set of music content items based on a set of music embeddings associated with the set of music content items and a video embedding associated with a video content item. A set of music embeddings can be mapped to a vector space with a video embedding. In the vector space, proximities between the set of music embeddings and the video embeddings can indicate various interrelationships between the associated set of music content items and the video content item. Music embeddings that are closer in proximity to the video embedding in the vector space can be associated with music content items that are more likely to be complementary to (e.g., relatively better matched with) the video content item than music content items associated with music embeddings that are farther in proximity. A subset of the music embeddings can be determined based on a nearest neighbor algorithm (e.g., k-nearest neighbors (k-NN)). The subset of music embeddings can include music embeddings that are within a threshold proximity to the video embedding in the vector space. The music content items associated with this subset of music embeddings can be potential recommendations for inclusion in the video content item. The ranking module 108 can rank a subset of music embeddings and a recommendation for a music content item to be included in a video content item can be generated based on the ranking. The subset of music embeddings can be ranked based on an evaluation of the subset of music embeddings and a video content item associated with the video content item. The evaluation can, for example, be based on a proximity or a measure of similarity (e.g., cosine similarity) between the subset of music embeddings and the video embedding. Higher ranked music embeddings in the subset of music embeddings can be associated with music content items that are more complementary to the video content item than music content items in the subset of music embeddings that are lower ranked. A recommendation for a music content item to be included in the video content item can be generated based on the music content item being associated with the highest ranked music embedding in the subset of music embeddings. In some cases, recommendations for music content items to be included in the video content item can be generated based on the music content items being associated with music embeddings in the subset of music embeddings that satisfy a threshold ranking. For example, a user can provide a video content item, and a video embedding can be generated based on the video content item. The video embedding can be mapped in a vector space with a set of music embeddings associated with a library of available music content items. A subset of music embeddings can be determined based on music embeddings in the set of music embeddings that are within a threshold proximity of the video embedding. The subset of music embeddings can be evaluated with the video embedding and ranked based on a measure of similarity to the video embedding. The highest ranked music embedding can be associated with a music content item that is more likely to complement the video content item. A recommendation to include the music content item in the video content item can be generated and provided to the user. Many variations are possible.

Figure 2A:
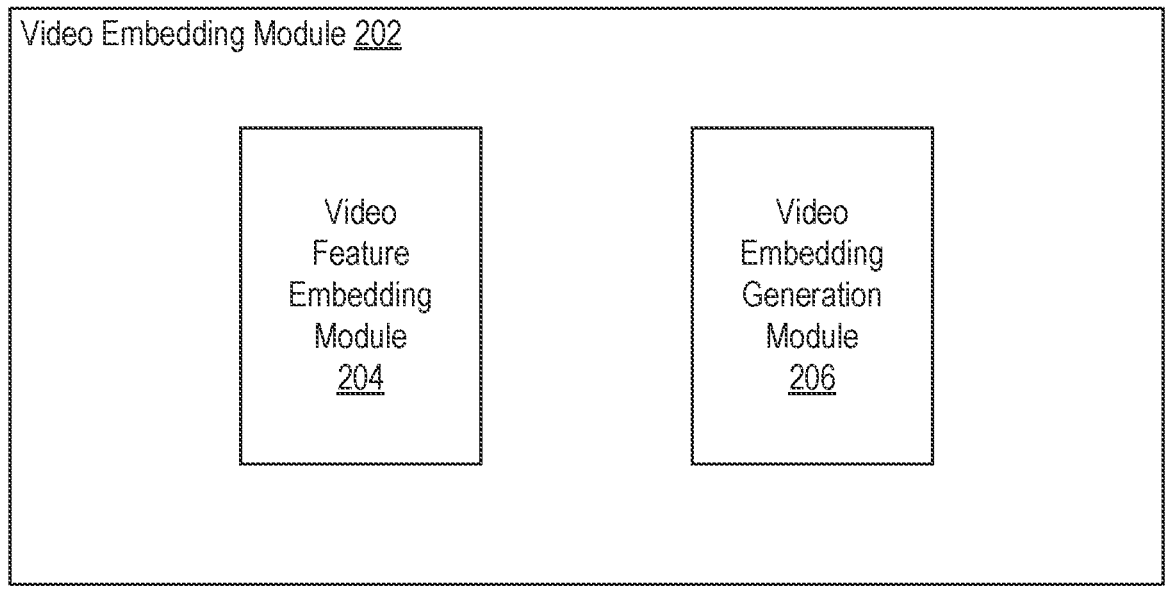
FIG. 2A illustrates an example video embedding module, according to an embodiment of the present technology.

FIG. 2A illustrates an example video embedding module 202 configured to generate a video embedding based on a video content item, according to an embodiment of the present technology. In some embodiments, the video embedding module 104 of FIG. 1 can be implemented as the video embedding module 202. As shown in FIG. 2A, the video embedding module 202 can include a video feature embedding module 204 and a video embedding generation module 206.

The video feature embedding module 204 can generate video feature embeddings based on features associated with a video content item. Features associated with a video content item can include, for example, concepts, objects, and visual characteristics identified in the video content item. The features can be identified based on machine learning methodologies applied to one or more frames of the video content item. A concept identified in a video content item can describe an idea or impression associated with the video content item. For example, a concept can be an event, such as a birthday, a wedding, or a festival. A concept can be a time of day, such as morning, noon, or night. A concept can be a type of scenery, such as a nature scene, a sunset, a beach scene, or a city scene. A concept can be a location, such as a forest, an ocean, a beach, or a city. An object identified in a video content item can describe one or more items depicted by the video content item. For example, an object can be a face, a building, a vehicle, or a shape. A visual characteristic identified in a video content item can be a visual quality or visual trait associated with the video content item. For example, a visual characteristic can be a color scheme or an art style. Many variations are possible.

Video feature embeddings based on features associated with a video content item can be generated based on one or more machine learning methodologies. One or more machine learning models can be trained to identify concepts, objects, and visual characteristics in a video content item. The machine learning models can be applied to a video content item to identify concepts, objects, and visual characteristics in the video content item. The machine learning models can be trained with training sets of data including frames of video content items and concept labels associated with the frames, object labels associated with the frames, or visual characteristics labels associated with the frames. Positive training data can include frames of video content items and concept labels of concepts identified in the frames, object labels of objects identified in the frames, or visual characteristics labels of visual characteristics identified in the frames. Negative training data can include frames of video content items and concept labels of concepts that are not identified in the frames, object labels of objects not identified in the frames, or visual characteristics labels of visual characteristics not identified in the frames. A trained machine learning model can be applied to a video content item, or one or more frames of the video content item, and generate a video feature embedding based on concepts, objects, or visual characteristics identified in the video content item. A video feature embedding can be a numerical representation of features, such as concepts, objects, or visual characteristics, identified in a video content item. The video feature embedding can be mapped to a vector space and compared with other video feature embeddings based on features identified in other video content items. Video content items with video feature embeddings that are closer in proximity may include features with a greater degree of similarity than video content items with video feature embeddings that are farther in proximity. For example, a machine learning model can be trained using a training set of data that includes frames of video content items and concept labels of concepts identified in the frames of the video content items. The trained machine learning model can be applied, for example, to frames of an input video content item depicting a walk through a park. The trained machine learning can generate a video feature embedding based on the frames of the input video content item and concepts, such as nature and park, identified in the frames of the input video content item. The video feature embedding associated with the input video content item can be mapped to a vector space and compared with video feature embeddings of other video content items. In this example, some of the other video content items may also depict nature concepts and park concepts. The video feature embeddings associated with other video content items that also depict nature concepts and park concepts can be closer in proximity to the video feature embedding associated with the input video content item than video feature embeddings associated with other video content items that do not depict nature concepts and park concepts. Based on the proximities of the video feature embedding associated with the input video content item to the other video feature embeddings of the other video content items, it can be determined that the other video content items that depict nature concepts and park concepts are more similar to the input video content item than the other video content items that do not depict nature concepts and park concepts. Many variations are possible.

In some cases, a machine learning model (e.g., convolutional neural network, deep neural network) can be utilized to generate different types of video feature embeddings, including video feature embeddings based on concepts identified in a video content item, video feature embeddings based on objects identified in the video content item, and video feature embeddings based on visual characteristics identified in the video content item. The machine learning model can include multiple layers, and the layers can correspond to different features that can be identified in a frame of a video content item. Low-level layers of the machine learning model can correspond to, for example, edges or other semantic information identified in the frame. High-level layers of the machine learning model can connect information from the low-level stages to identify, for example, concepts, objects, or visual characteristics in the frame. Video feature embeddings can be generated based on different layers of the machine learning model. For example, a first layer in a machine learning model can output a video feature embedding based on concepts identified in a video content item. A second layer, which can be a lower-level layer than the first layer, in the machine learning model can output a video feature embedding based on objects identified in the video content item. A third layer, which can be a lower-level layer than the first layer and the second layer, can output a video feature embedding based on visual characteristics identified in the video content item. Many variations are possible.

The video embedding generation module 206 can generate a video embedding associated with a video content item based on one or more video feature embeddings associated with the video content item. The video feature embeddings can be combined (e.g., concatenated). The combination of video feature embeddings can be transformed (e.g. weighted, normalized). The transformation can involve weighting values of the combination of video feature embeddings, normalizing values of the combination of video feature embeddings, and removing values from the combination of video feature embeddings. In some cases, the transformation can involve applying a sigmoidal function to the combination of video feature embeddings. The transformed combination of video feature embeddings can be utilized as the video embedding. The video embedding can be evaluated with music embeddings associated with music content items, and the music content items can be ranked based on the evaluation. A video embedding can be generated based on one or more machine learning methodologies. A machine learning model can be trained to combine and transform video feature embeddings to generate a video embedding. The machine learning model can be applied to one or more video feature embeddings to generate a video embedding. The machine learning model can be trained with training sets of data including video feature embeddings associated with video content items and music content items associated with the video content items. Positive training data can include video feature embeddings associated with video content items and music content items included in the video content items. Negative training data can include video feature embeddings associated with video content items and music content items not included in the video content items. A trained machine learning model can be applied to video feature embeddings associated with a video content item, and the trained machine learning model can combine the video feature embeddings and transform the combination of video feature embeddings to generate a video embedding. A video embedding can be a numerical representation of features associated with a video content item. The video embedding can be mapped to a vector space and compared with music embeddings associated with music content items. Music content items associated with music embeddings that are closer in proximity to the video embedding can be ranked higher than music content items associated with music embeddings that are farther in proximity to the video embedding. Many variations are possible.

Figure 2B:
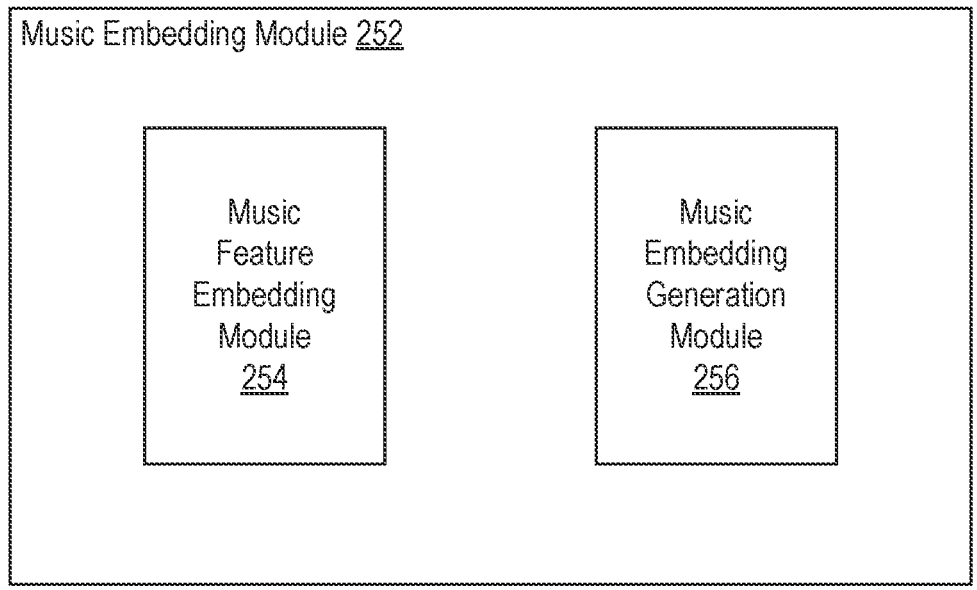
FIG. 2B illustrates an example music embedding module, according to an embodiment of the present technology.

FIG. 2B illustrates an example music embedding module 252 configured to generate a music embedding based on a music content item, according to an embodiment of the present technology. In some embodiments, the music embedding module 106 of FIG. 1 can be implemented as the music embedding module 252. As shown in FIG. 2B, the music embedding module 252 can include a music feature embedding module 254 and a music embedding generation module 256.

The music feature embedding module 254 can generate music feature embeddings based on features associated with a music content item. Features associated with a music content item can include, for example, a song title, an artist, genres, lyrics, and one or more spectrograms associated with the music content item. A music feature embedding can be generated based on machine learning methodologies (e.g., text recognition, sound recognition). One or more machine learning models can be trained to generate music feature embeddings based on features associated with music content items. The machine learning models can be trained with training sets of data including music content items and associated song titles, artists, genres, lyrics, or spectrograms. Positive training data can include music content items with similar song titles, similar artists, similar genres, or similar lyrics. Positive training data can also include spectrograms associated with similar music content items. Negative training data can include music content items with dissimilar song titles, dissimilar artists, dissimilar genres, or dissimilar lyrics. Negative training data can also include spectrograms associated with dissimilar music content items. A trained machine learning model can be applied to a music content item and generate a music feature embedding based on, individually or in combination, a song title, an artist, genres, lyrics, or spectrograms associated with the music content item. The music feature embedding can be mapped to a vector space and compared with other music feature embeddings based on features associated with other music content items. Music content items corresponding to music feature embeddings that are closer in proximity may be associated with features that are more similar than music content items corresponding to music embeddings that are farther in proximity. For example, a machine learning model can be trained using a training set of data that includes spectrograms associated with music content items. The trained machine learning model can be applied to a spectrogram of an input music content item and generate a music feature embedding corresponding to the input music content item. The music feature embedding can be mapped to a vector space with music feature embeddings corresponding to other music content items. Music content items corresponding to music feature embeddings that are closer in proximity to the music feature embedding corresponding to the input music content item can be associated with spectrograms that are more similar to the spectrogram associated with the input music content item than music content items corresponding to music feature embeddings that are farther in proximity to the music feature embedding corresponding to the input music content item. In some cases, the music content items that are associated with spectrograms that are more similar to the spectrogram associated with the input music content item can be considered to sound more similar to the input music content item than the music content items that are associated with spectrograms that are less similar to the spectrogram associated with the input music content item. Many variations are possible.

The music embedding generation module 256 can generate a music embedding associated with a music content item based on one or more music feature embeddings associated with the music content item. The music feature embeddings can be combined (e.g., concatenated). The combination of music feature embeddings can be transformed (e.g., weighted, normalized). The transformation can involve weighting values of the combination of music feature embeddings, normalizing values of the combination of music feature embeddings, and removing values from the combination of music feature embeddings. In some cases, the transformation can involve applying a sigmoidal function to the combination of music feature embeddings. The transformed combination of music feature embeddings can be utilized as the music embedding. Music embeddings associated with music content items can be evaluated with a video embedding associated with a video content item, and the music content items can be ranked based on the evaluation. A music embedding can be generated based on one or more machine learning methodologies. A machine learning model can be trained to combine and transform music feature embeddings to generate a music embedding. The machine learning model can be applied to one or more music feature embeddings to generate a music embedding. The machine learning model can be trained with training sets of data including music feature embeddings associated with music content items and video content items associated with the music content items. Positive training data can include music feature embeddings associated with music content items and video content items in which the music content items were included. Negative training data can include music feature embeddings associated with music content items and video content items in which the music content items were not included. A trained machine learning model can be applied to music feature embeddings associated with a music content item, and the trained machine learning model can combine the music feature embeddings and transform the combination of music feature embeddings to generate a music embedding. A music embedding can be a numerical representation of features associated with a music content item. Music embeddings associated with music content items can be mapped to a vector space and compared with a video embedding associated with a video content item. The music content items can be ranked based on the comparison of the music embeddings with the video embedding. Many variations are possible.

Figure 3:
FIG. 3 illustrates an example functional block diagram, according to an embodiment of the present technology.

FIG. 3 illustrates an example functional block diagram 300, according to an embodiment of the present technology. The example functional block diagram 300 illustrates an example usage of machine learning methodologies for generating music recommendations, as can be performed by the music recommendation module 102 of FIG. 1. It should be understood that there can be additional, fewer, or alternative steps performed in similar or alternative orders, or in parallel, based on the various features and embodiments discussed herein unless otherwise stated.

In this example, a video content item 302 can be provided to a video feature embedding model 304. The video feature embedding model 304 can generate a video object embedding 306a and a video concept embedding 306b based on objects identified in the video content item 302 and concepts identified in the video content item 302. The video object embedding 306a and the video concept embedding 306b can be provided to a video embedding generation model 308. The video embedding generation model 308 can combine and transform the video object embedding 306a and the video concept embedding 306b to generate a video embedding 310. Also in this example, a set of music content items 312 can be provided to music feature embedding models 314. The music feature embedding models 314 can generate a set of music title and lyric embeddings 316a, a set of music genre embeddings 316b, and a set of music spectrogram embeddings 316c based on titles and lyrics identified in the set of music content items 312, genres identified in the set of music content items 312, and spectrograms associated with the set of music content items 312. Each music content item in the set of music content items 312 can correspond to a respective music title and lyric embedding, a respective music genre embedding, and a respective music spectrogram embedding. The set of music title and lyric embeddings 316a, the set of music genre embeddings 316b, and the set of music spectrogram embeddings 316c can be provided to a music embedding generation model 318. The music embedding generation model 318 can combine and transform the set of music title and lyric embeddings 316a, the set of music genre embeddings 316b, and the set of music spectrogram embeddings 316c to generate a set of music embeddings 320. Each music content item in the set of music content items 312 can have a corresponding music embedding in the set of music embeddings 320. Further in this example, the video embedding 310 and the set of music embeddings 320 can be utilized in performing an embedding evaluation 322. The embedding evaluation 322 can involve mapping the video embedding 310 and the music embeddings 322 to a vector space, identifying a subset of music embeddings from the set of music embeddings 320 based on a proximity between each music embedding in the set of music embeddings 320 and the video embedding 310 and ranking the subset of music embeddings based on a cosine similarity between each music embedding in the subset of music embeddings and the video embedding 310. Based on the embedding evaluation 322, music recommendations 324 can be generated for the video content item 302. All examples herein are provided for illustrative purposes, and there can be many variations and other possibilities.

Figure 4:
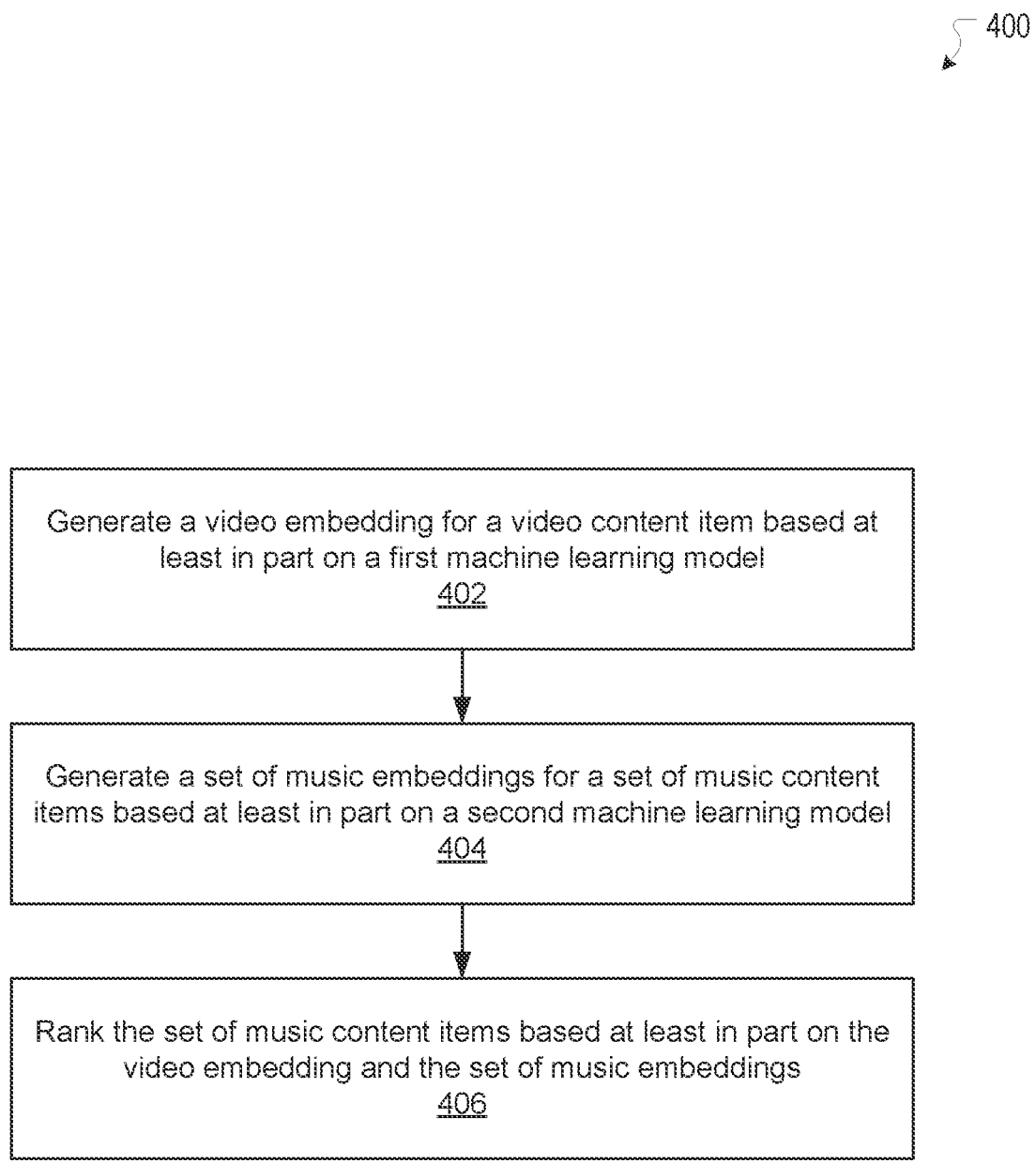
FIG. 4 illustrates an example method, according to an embodiment of the present technology.

FIG. 4 illustrates an example method 400, according to an embodiment of the present technology. It should be understood that there can be additional, fewer, or alternative steps performed in similar or alternative orders, or in parallel, based on the various features and embodiments discussed herein unless otherwise stated.

At block 402, the example method 400 generates a video embedding for a video content item based at least in part on a first machine learning model. At block 404, the example method 400 generates a set of music embeddings for a set of music content items based at least in part on a second machine learning model. At block 406, the example method 400 ranks the set of music content items based at least in part on the video embedding and the set of music embeddings.

Figure 5:
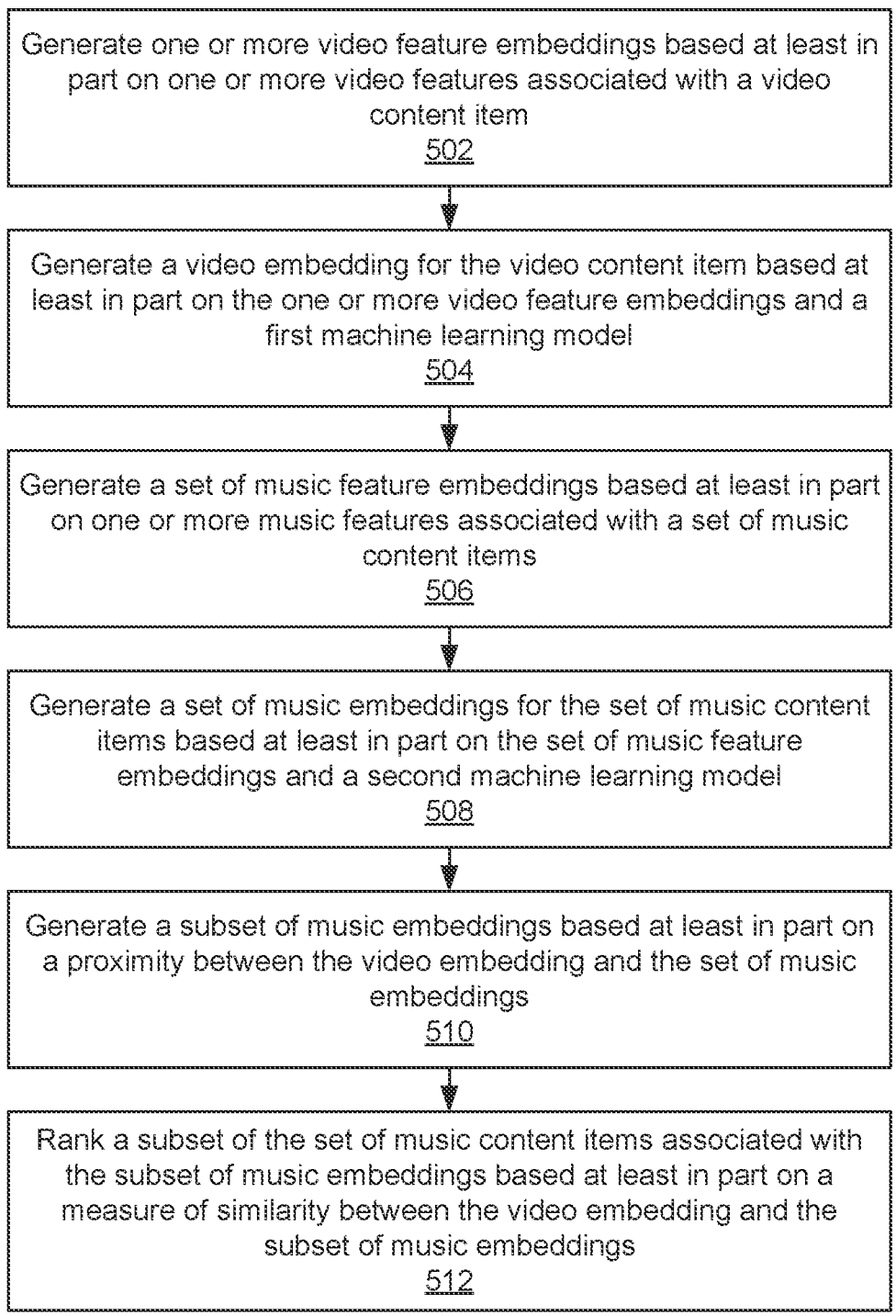
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 generates one or more video feature embeddings based at least in part on one or more video features associated with a video content item. At block 504, the example method 500 generates a video embedding for the video content item based at least in part on the one or more video feature embeddings and a first machine learning model. At block 506, the example method 500 generates a set of music feature embeddings based at least in part on one or more music features associated with a set of music content items. At block 508, the example method 500 generates a set of music embeddings for the set of music content items based at least in part on the set of music feature embeddings and a second machine learning model. At block 510, the example method 500 generates a subset of music embeddings based at least in part on a proximity between the video embedding and the set of music embeddings. At block 512, the example method 500 ranks a subset of the set of music content items associated with the subset of music embeddings based at least in part on a measure of similarity between the video embedding and the subset of music embeddings.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
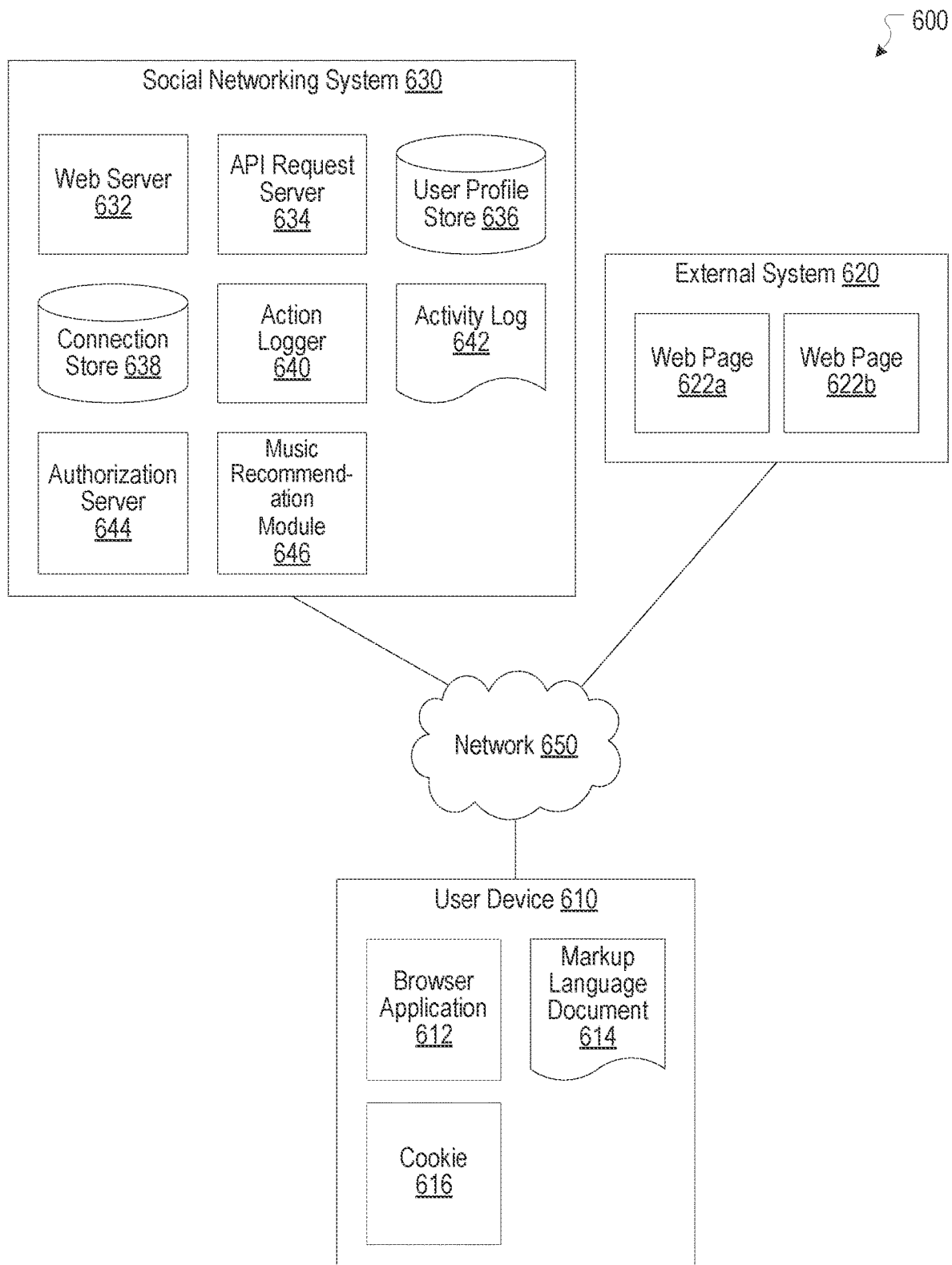
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a music surface module 646. The music surface module 646 can, for example, be implemented as the music surface module 102, as discussed in more detail herein. As discussed previously, it should be appreciated that there can be many variations or other possibilities. For example, in some embodiments, one or more functionalities of the music surface module 646 can be implemented in the user device 610. As discussed previously, it should be appreciated that there can be many variations or other possibilities.

Hardware Implementation

Figure 7:
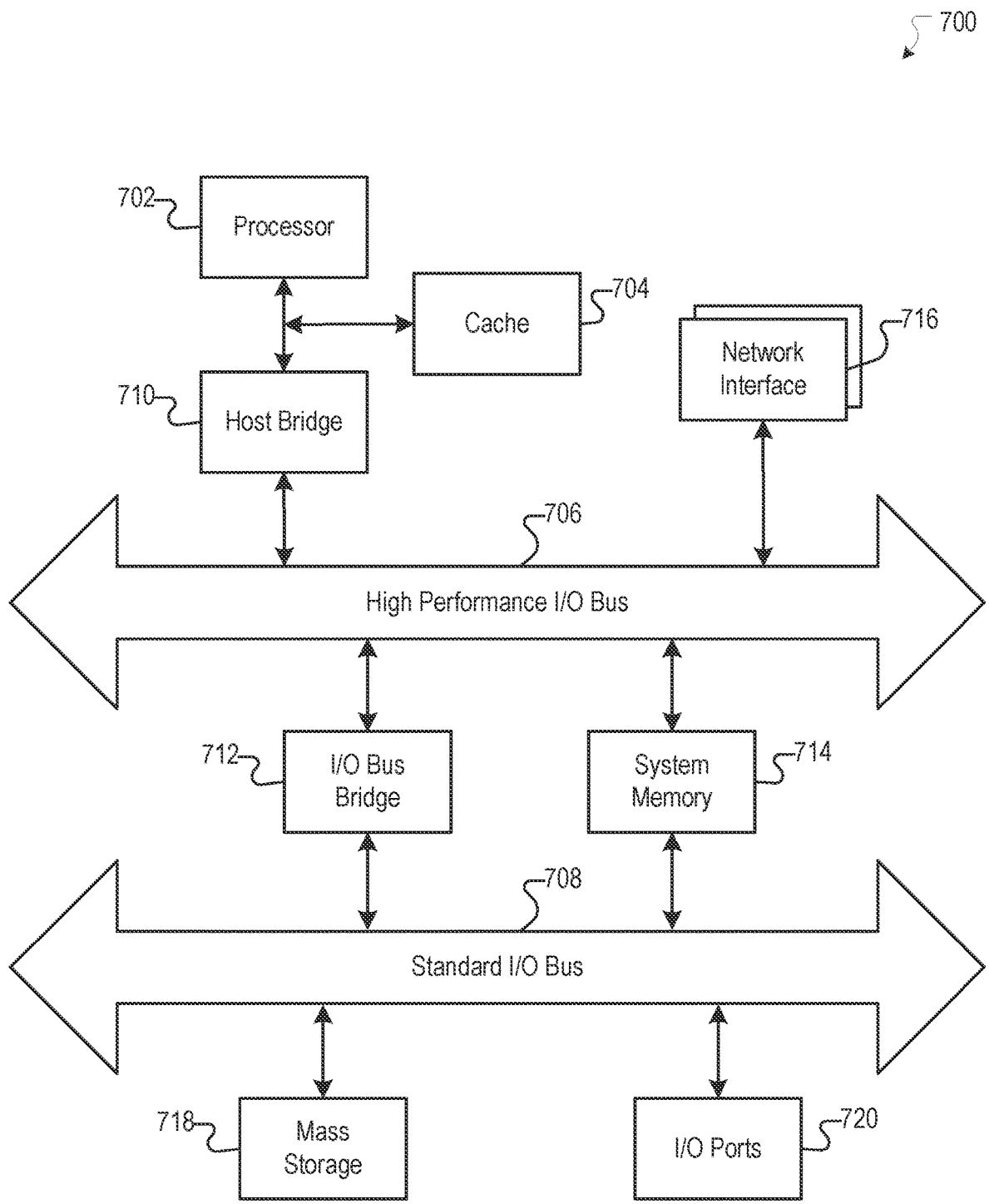
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, a video embedding for a video content item based at least in part on a first machine learning model;
   generating, by the computing system, a set of music embeddings for a set of music content items based at least in part on a second machine learning model, wherein a music embedding of the set of music embeddings is generated based at least in part on a combination of music feature embeddings associated with a corresponding music content item of the set of music content items and one or more values are removed from the combination of music feature embeddings based at least in part on the second machine learning model; and
   ranking, by the computing system, the set of music content items based at least in part on a mapping of the video embedding and the set of music embeddings in a vector space and proximities between the video embedding and the set of music embeddings in the vector space.

2. The computer-implemented method of claim 1, further comprising:
   generating one or more video feature embeddings based at least in part on one or more video features associated with the video content item; and
   wherein the video embedding is generated based at least in part on the one or more video feature embeddings.

3. The computer-implemented method of claim 2, wherein the one or more video features associated with the video content item includes at least one of: a concept, an object, or a visual characteristic identified in the video content item.

4. The computer-implemented method of claim 1, further comprising:
generating the music feature embeddings for the corresponding music content item based at least in part on music features associated with the corresponding music content item; and
wherein the combination of the music feature embeddings is based at least in part on a concatenation of the music feature embeddings.

5. The computer-implemented method of claim 4, wherein the music features associated with the corresponding music content item include at least one of: a title, an artist, a lyric, a genre, or a spectrogram associated with the corresponding music content item.

6. The computer-implemented method of claim 1, wherein the ranking the set of music content items comprises:
generating a subset of music embeddings based at least in part on the proximities between the video embedding and the set of music embeddings, wherein the subset of music embeddings are within a threshold proximity to the video embedding.

7. The computer-implemented method of claim 6, wherein the ranking the set of music content items further comprises:
ranking a subset of the set of music content items associated with the subset of music embeddings based at least in part on a measure of similarity between the video embedding and the subset of music embeddings.

8. The computer-implemented method of claim 1, wherein the music content items associated with the music embeddings that are closer in proximity to the video embedding are ranked higher than the music content items with the music embeddings that are farther in proximity to the video embedding.

9. The computer-implemented method of claim 1, wherein the first machine learning model and the second machine learning model are trained based at least in part on training sets of data that include training video content items and training music content items included in the training video content items.

10. The computer-implemented method of claim 1, further comprising:
providing one or more music recommendations based at least in part on the ranking.

11. A system comprising:
at least one processor; and
a memory storing instructions that, when executed by the at least one processor, cause the system to perform a method comprising:
generating a video embedding for a video content item based at least in part on a first machine learning model;
generating a set of music embeddings for a set of music content items based at least in part on a second machine learning model, wherein a music embedding of the set of music embeddings is generated based at least in part on a combination of music feature embeddings associated with a corresponding music content item of the set of music content items and one or more values are removed from the combination of music feature embeddings based at least in part on the second machine learning model; and
ranking the set of music content items based at least in part on a mapping of the video embedding and the set of music embeddings in a vector space and proximities between the video embedding and the set of music embeddings in the vector space.

12. The system of claim 11, further comprising:
generating one or more video feature embeddings based at least in part on one or more video features associated with the video content item; and
wherein the video embedding is generated based at least in part on the one or more video feature embeddings.

13. The system of claim 12, wherein the one or more video features associated with the video content item includes at least one of: a concept, an object, or a visual characteristic identified in the video content item.

14. The system of claim 11, further comprising:
generating the music feature embeddings for the corresponding music content item based at least in part on music features associated with the corresponding music content item; and
wherein the combination of the music feature embeddings is based at least in part on a concatenation of the music feature embeddings.

15. The system of claim 14, wherein the one or more music features associated with the corresponding music content item include at least one of: a title, an artist, a lyric, a genre, or a spectrogram associated with the corresponding music content item.

16. A non-transitory computer-readable storage medium including instructions that, when executed by at least one processor of a computing system, cause the computing system to perform a method comprising:
generating a video embedding for a video content item based at least in part on a first machine learning model;
generating a set of music embeddings for a set of music content items based at least in part on a second machine learning model, wherein a music embedding of the set of music embeddings is generated based at least in part on a combination of music feature embeddings associated with a corresponding music content item of the set of music content items and one or more values are removed from the combination of music feature embeddings based at least in part on the second machine learning model; and
ranking the set of music content items based at least in part on a mapping of the video embedding and the set of music embeddings in a vector space and proximities between the video embedding and the set of music embeddings in the vector space.

17. The non-transitory computer-readable storage medium of claim 16, further comprising:
generating one or more video feature embeddings based at least in part on one or more video features associated with the video content item; and
wherein the video embedding is generated based at least in part on the one or more video feature embeddings.

18. The non-transitory computer-readable storage medium of claim 17, wherein the one or more video features associated with the video content item includes at least one of: a concept, an object, or a visual characteristic identified in the video content item.

19. The non-transitory computer-readable storage medium of claim 16, further comprising:
generating the music feature embeddings for the corresponding music content item based at least in part on music features associated with the corresponding music content item; and
wherein the combination of the music feature embeddings is based at least in part on a concatenation of the music feature embeddings.

20. The non-transitory computer-readable storage medium of claim 19, wherein the music features associated with the corresponding music content item include at least one of: a title, an artist, a lyric, a genre, or a spectrogram associated with the corresponding music content items.

* * * * *